W. A. CRAWFORD-FROST.
AUTOMOBILE FENDER.
APPLICATION FILED DEC. 6, 1911.
1,054,510.  Patented Feb. 25, 1913.
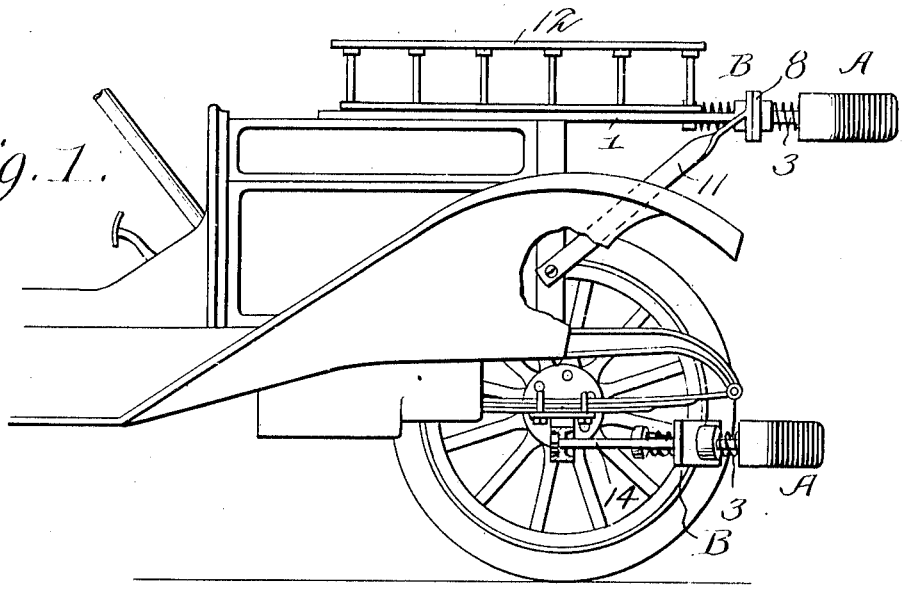
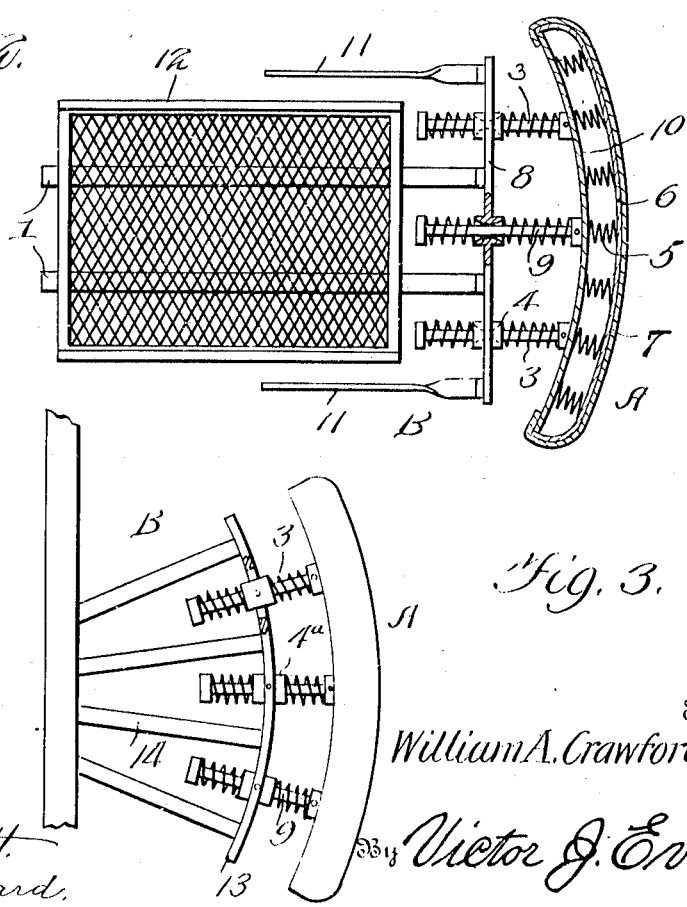
Witnesses
Hugh H. Ott.
U. B. Hillyard.
Inventor
William A. Crawford-Frost,
By Victor J. Evans
Attorney

UNITED STATES PATENT OFFICE.

WILLIAM A. CRAWFORD-FROST, OF BALTIMORE, MARYLAND.

AUTOMOBILE-FENDER.

1,054,510.   Specification of Letters Patent.   Patented Feb. 25, 1913.

Application filed December 6, 1911. Serial No. 664,246.

*To all whom it may concern:*

Be it known that I, WILLIAM A. CRAWFORD-FROST, a citizen of the United States, residing at Windsor Hill, Baltimore, in the State of Maryland, have invented new and useful Improvements in Automobile-Fenders, of which the following is a specification.

The present invention while primarily designed to provide a fender for automobiles and like machines nevertheless contemplates a fender or buffer for general use for relieving shock due to the impact of moving bodies when coming in contact with an object.

The invention provides a fender having for its object to save life and to prevent injury to the moving vehicle or part to which the fender is attached, the fender embodying essentially two parts, the one to prevent injury to the person and the other to absorb shock and prevent damage to the machine, the fender being likewise of such formation as to throw the person or object to one side out of the path of the machine.

The invention further contemplates upper and lower fenders, the upper fender projecting some distance in advance of the lower fender so as to throw the person forward in the event of collision, thereby reducing the chances of a fatality to the smallest amount possible. The lower fender is designed chiefly to receive the impact in the event of head-on collision or when the machine collides with a post, tree, or other like object.

The invention consists of the novel features, details of construction and combination of parts, which hereinafter will be more particularly set forth, and which are illustrated in the accompanying drawing, and pointed out in the appended claim.

Referring to the drawing, forming a part of the specification, Figure 1 is a side view of the front portion of an automobile provided with safety appliances embodying the invention. Fig. 2 is a plan view of the upper fender. Fig. 3 is a plan view of the lower fender.

Corresponding and like parts are referred to in the following description, and indicated in all the views of the drawing, by the same reference characters.

The upper and the lower fenders are of similar formation each comprising an outer member A and an inner member B, the two members having cushioning devices interposed between them. The upper member projects a short distance in advance of the lower member so as to throw a person forwardly in the event of a collision. The cushioning devices of the upper fender are of less tension than the cushioning devices of the lower fender, the purpose being to strike the person as light a blow as possible. The outer members A of the upper and lower fenders are curved transversely, the curvature being such as may be found to give the best results, the purpose being to throw the object struck to one side out of the path of the machine to prevent the wheels passing over the object. The transverse curvature of the outer impact member A also causes the machine to carom in the event of a head-on collision. The cushioning devices interposed between the two members consist of stout helical springs 3 and $3^a$ of the expansible type, two sets of such springs being provided and located upon opposite sides of the inner member B. The inner or rear set of springs 3 sustains the rebound, whereas the outer or forward set of springs $3^a$ receives the impact when collision occurs. The outer or impact member A is likewise provided with cushioning devices 5, the same consisting of helical springs of lighter tension than the springs 3 and $3^a$ so as to yield more readily and thereby prevent injury to the person when struck. The springs 5 are inclosed, the covering consisting of a lining 6 of felt or other padding material and a cover 7 of leather or analogous material generally employed in upholstery work.

The upper fender has the bar 8 of the member B straight and provided with openings to receive rods 9, which are connected at their forward ends with the curved bar 10 of the member A. Bosses 4 formed or otherwise provided upon the bar 8 in line with the openings thereof project forwardly and rearwardly from said bar a distance to afford a substantial bearing for the bars or rods 9. The rods or bars 9 are connected at their forward ends to rearwardly extending projections of the bar 10 in a manner to admit of the member A yielding laterally when struck a glancing or oblique blow. The rods or bars 9 also have a limited lateral play in the bosses 4, provision being had for such movement by enlarging the openings through the bosses 4 in a horizontal plane. Bars 1 project rearwardly from the bar 8 and are connected to the machine in any convenient and substantial way. Braces 11 also connect the bar 8 with the machine to stay the upper fender from a point below. A light railing 12 is fitted to the upper fender and may serve as a wind break and also as a luggage carrier. The bars 1 have a parallel arrangement.

The inner or rear member B of the lower fender has its bar 13 transversely curved and connected to a convenient part of the machine by means of bars or rods 14, which have an approximate radial arrangement. The rods or bars 9 connecting the outer member with the inner member pass through guides 4ª which are pivotally connected to the bar 13 so as to swing in a horizontal plane, thereby providing for a yielding movement of the outer member A when sustaining a blow or impact.

It will be understood from the foregoing, taken in connection with the accompanying drawings, that the invention provides a buffer which will save life by throwing a person forwardly instead of backwardly in the event of collision; and which will throw the person to one side so as to be out of the way of the wheels; and which will yield when struck an oblique blow, thereby preventing serious injury both to the buffer and car; and which moreover will prevent damage in a head-on collision by causing the cars to carom or a single car to swerve laterally when receiving an impact, or when striking a post, tree, or like object; and lastly provides a buffer which shall present a surface of sufficient depth to insure the striking of the buffers when cars similarly equipped come together.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A buffer of the character described comprising a member, a plurality of guides pivotally connected to the member, an impact bar, rods pivotally connected to the impact bar and passing through the said guides, and expansible helical springs mounted upon the rods between the impact bar and guides.

In testimony whereof I affix my signature in presence of two witnesses.

WILLIAM A. CRAWFORD-FROST.

Witnesses:
GEORGE W. MANLY,
WILLIAM E. SCHUL.